(12) United States Patent
Zheng et al.

(10) Patent No.: US 11,009,747 B2
(45) Date of Patent: May 18, 2021

(54) BACKLIGHT MODULE AND DISPLAY DEVICE

(71) Applicant: XIAMEN TIANMA MICRO-ELECTRONICS CO., LTD., Xiamen (CN)

(72) Inventors: Binyi Zheng, Xiamen (CN); Zhuo Deng, Xiamen (CN); Ling Wu, Xiamen (CN); Boping Shen, Xiamen (CN)

(73) Assignee: XIAMEN TIANMA MICRO-ELECTRONICS CO., LTD., Xiamen (CN)

( * ) Notice: Subject to any disclaimer, the term of this patent is extended or adjusted under 35 U.S.C. 154(b) by 21 days.

(21) Appl. No.: 16/361,851

(22) Filed: Mar. 22, 2019

(65) Prior Publication Data

US 2020/0201117 A1    Jun. 25, 2020

(30) Foreign Application Priority Data

Dec. 24, 2018 (CN) .......................... 201811582289.7

(51) Int. Cl.
| | |
|---|---|
| *G06F 1/00* | (2006.01) |
| *G02F 1/13357* | (2006.01) |
| *G02B 5/02* | (2006.01) |
| *G02F 1/133* | (2006.01) |
| *G02F 1/1362* | (2006.01) |
| *G06K 9/00* | (2006.01) |

(52) U.S. Cl.
CPC ..... *G02F 1/133606* (2013.01); *G02B 5/0205* (2013.01); *G02F 1/13306* (2013.01); *G02F 1/136286* (2013.01); *G06K 9/00087* (2013.01)

(58) Field of Classification Search
CPC ... G06K 9/00; G06K 9/20; G06T 7/40; H01L 27/32; H01L 51/52
See application file for complete search history.

(56) References Cited

U.S. PATENT DOCUMENTS

| | | | |
|---|---|---|---|
| 2018/0005007 A1* | 1/2018 | Du | G09G 3/3225 |
| 2018/0315803 A1* | 11/2018 | Jin | H01L 27/323 |
| 2019/0214420 A1* | 7/2019 | Kim | H01L 27/1463 |

FOREIGN PATENT DOCUMENTS

| | | |
|---|---|---|
| CN | 205375501 U | 7/2016 |
| CN | 106022292 A | 10/2016 |
| CN | 107133613 A | 9/2017 |
| CN | 108010933 A | 5/2018 |

\* cited by examiner

*Primary Examiner* — Michael A Faragalla
(74) *Attorney, Agent, or Firm* — Anova Law Group PLLC

(57) ABSTRACT

Backlight module and display device are provided. The backlight module includes: a first substrate, a drive circuit on a side of the first substrate, a plurality of light-emitting elements and a plurality of fingerprint recognition elements, where the drive circuit includes a first drive circuit and a second drive circuit; the plurality of the light-emitting elements is on a side of the drive circuit away from the first substrate; the light-emitting element is electrically connected to the first drive circuit; the plurality of the light-emitting elements is arranged in an array structure; the plurality of the fingerprint recognition elements and the plurality of the light-emitting elements are on a same side of the first substrate; and the fingerprint recognition element is electrically connected to the second drive circuit.

17 Claims, 15 Drawing Sheets

— BACKLIGHT MODULE AND DISPLAY DEVICE

CROSS-REFERENCES TO RELATED APPLICATIONS

This application claims the priority of Chinese Patent Application No. 201811582289.7, filed on Dec. 24, 2018, the content of which is incorporated herein by reference in its entirety.

TECHNICAL FIELD

The present disclosure generally relates to the field of display technology and more particularly, relates to a backlight module and a display device.

BACKGROUND

With development of multimedia technology, more intelligent and portable electronic devices, such as mobile phones, personal laptops and tablets, have become essential tools in people's lives. The portable electronic devices include large amount of user's personal information, such as phone books, photos, etc. In order to ensure the security of user's personal information, it is necessary to verify user's identity or authorization. Nowadays, the methods of authenticating of user identity or authorization includes face recognition, fingerprint recognition, password input, etc. Since the fingerprint identification is simple and fast, most of current electronic devices use fingerprint recognition for identity or authorization verification.

In a conventional display device, an edge-lit mode is applied for the backlight source, which causes large loss of light during the transmission process. In this case, when an optical method is used for performing fingerprint recognition and when the display device directly uses its own backlight as the reflected light of the optical fingerprint recognition, the fingerprint recognition with low precision will be provided.

SUMMARY

One aspect of the present disclosure provides a backlight module. The backlight module includes: a first substrate, a drive circuit on a side of the first substrate, a plurality of light-emitting elements and a plurality of fingerprint recognition elements. The drive circuit includes a first drive circuit and a second drive circuit. The plurality of the light-emitting elements is on a side of the drive circuit away from the first substrate. The light-emitting element is electrically connected to the first drive circuit. The plurality of the light-emitting elements is arranged in an array structure. The plurality of the fingerprint recognition elements and the plurality of the light-emitting elements are on a same side of the first substrate. The fingerprint recognition element is electrically connected to the second drive circuit.

Another aspect of the present disclosure provides a display device. The display device includes a backlight module and a display panel disposed opposite to the backlight module. The backlight module includes: a first substrate, a drive circuit on a side of the first substrate, a plurality of light-emitting elements and a plurality of fingerprint recognition elements. The drive circuit includes a first drive circuit and a second drive circuit. The plurality of the light-emitting elements is on a side of the drive circuit away from the first substrate. The light-emitting element is electrically connected to the first drive circuit. The plurality of the light-emitting elements is arranged in an array structure. The plurality of the fingerprint recognition elements and the plurality of the light-emitting elements are on a same side of the first substrate. The fingerprint recognition element is electrically connected to the second drive circuit.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure. Drawings incorporated in the specification and forming part of the specification demonstrate embodiments of the present disclosure and, together with the specification, describe the principles of the present disclosure.

DETAILED DESCRIPTION

Figure 1:
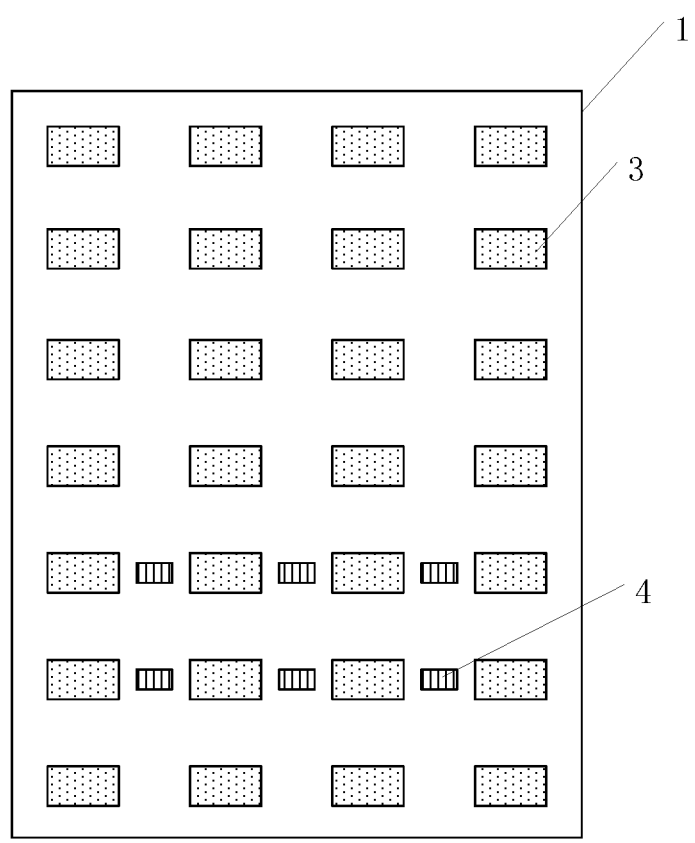
FIG. 1 illustrates a top-view structural schematic of an exemplary backlight module according to embodiments of the present disclosure.

Reference will now be made in detail to exemplary embodiments of the disclosure, which are illustrated in the accompanying drawings. Wherever possible, the same reference numbers will be used throughout the drawings to refer to the same or like parts.

Various exemplary embodiments of the present disclosure will be described in detail with reference to the drawings. It should be noted that the relative arrangements of elements and steps, numerical expressions and numerical values set forth in the embodiments are not intended to limit the scope of the present disclosure unless otherwise specified.

The following description of at least one exemplary embodiment is merely illustrative, and not as any limitations on the present disclosure and its application or use.

Techniques, methods and instruments known to those skilled in the art may not be discussed in detail, but where appropriate, the techniques, methods and instruments should be considered as part of the specification.

In all of the examples illustrated and discussed herein, any specific values should be construed as merely illustrative, and not as a limitation. Thus, other examples of the exemplary embodiments may have different values.

It should be noted that similar reference numerals and letters refer to similar items in the following figures, and therefore, once an item is defined in a figure, it is not required to be further discussed in the subsequent figures.

Figure 2:
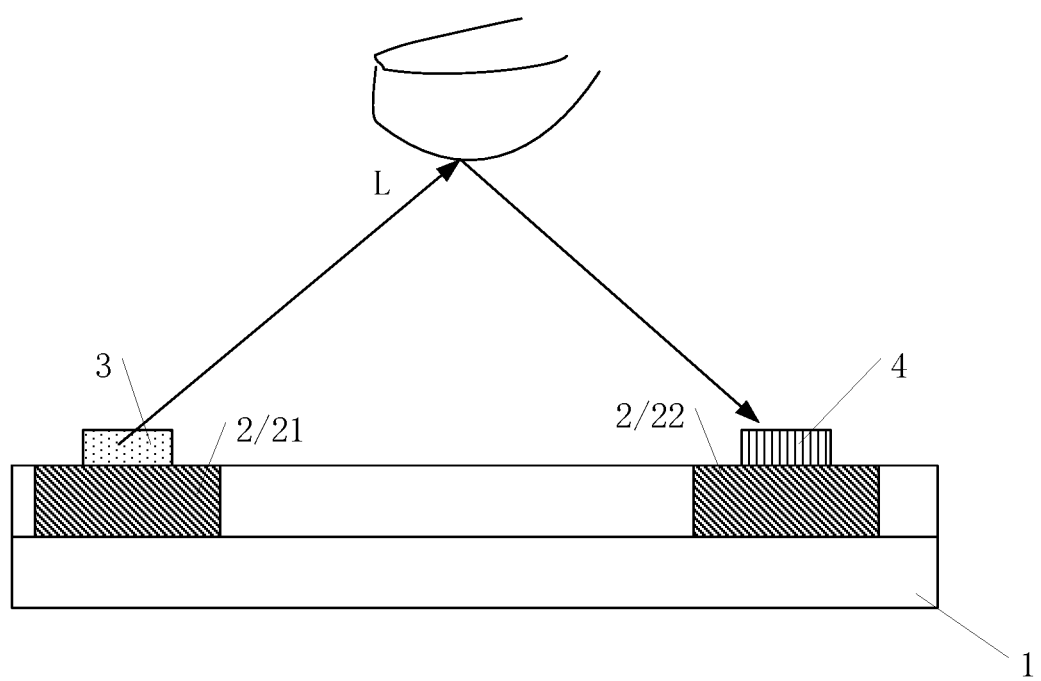
FIG. 2 illustrates a cross-sectional structural schematic of an exemplary backlight module according to embodiments of the present disclosure.

Referring to FIG. 1 and FIG. 2, FIG. 1 illustrates a top-view structural schematic of an exemplary backlight module according to the embodiments of the present disclosure and FIG. 2 illustrates a cross-sectional structural schematic of an exemplary backlight module according to the embodiments of the present disclosure. As shown in FIG. 1 and FIG. 2, the present disclosure may provide a backlight module including: a first substrate 1, a drive circuit 2 on a side of the first substrate 1, a plurality of light-emitting elements 3, and a plurality of fingerprint recognition elements 4. The drive circuit 2 may include a first drive circuit 21 and a second drive circuit 22. The plurality of the light-emitting elements 3 may be on a side of the drive circuit 2 away from the first substrate 1. The light-emitting element 3 may be electrically connected to the first drive circuit 21, and the plurality of the light-emitting elements 3 may be arranged in an array structure. The plurality of the fingerprint recognition elements 4 and the plurality of the light-emitting elements 3 may be on the same side of the first substrate 1. The fingerprint recognition element 4 may be electrically connected to the second drive circuit 22.

For example, as shown in FIG. 1 and FIG. 2, the backlight module provided by the embodiments of the present disclosure may include the plurality of the light-emitting elements 3 and the plurality of the fingerprint recognition elements 4. Optionally, the light-emitting elements 3 may be arranged in an array structure. The fingerprint recognition element 4 may be disposed between two adjacent light-emitting elements 3. Optionally, the light-emitting elements 3 may be mini light-emitting diodes (LEDs) which have sizes of about tens of micrometers. Mini LEDs have smaller size and lower power consumption compared with conventional LEDs. The light-emitting elements 3 may also be micro LEDs which have smaller size, higher luminous efficiency, and lower power consumption compared with min LEDs. It can be understood that only mini LEDs and micro LEDs may be used as examples for exemplary description in the present disclosure, and other types of the light-emitting elements may also be used, which may not be specifically limited according to various embodiments of the present disclosure. The first drive circuit 21 may be used to drive the light-emitting elements, and the second drive circuit 22 may be used to drive the fingerprint recognition elements. Optionally, the fingerprint recognition element 4 may include a photoelectric sensor, that is, the fingerprint recognition element 4 provided by one embodiment may perform the fingerprint recognition using photoelectric conversion. The working principle of the optical fingerprint recognition technology is that the light L emitted from the light-emitting element 3 in the backlight module may illuminate on a finger and be reflected by the finger to form reflected light; the formed reflected light may be transmitted to the fingerprint recognition element 4; and the fingerprint recognition element 4 may collect the incident light signal thereon. Due to the existence of a specific texture on the fingerprint, the intensity of the reflected light may be different at each position of the ridge and valley of the finger, and finally the light signal collected by each fingerprint recognition element 4 may be different, thereby implementing the fingerprint recognition function.

It should be noted that FIG. 2 only exemplarily illustrates the positional relationship of the film layers in the backlight module provided by the embodiments of the present disclosure, and the first drive circuit 21 and the second drive circuit 22 are not described in detail. The specific drive circuit structure may be described in detail hereafter.

In the backlight module provided by the embodiments, the light-emitting element may use the first drive circuit and the fingerprint recognition element may use the second drive circuit, which may separately drive the light-emitting element and the fingerprint recognition element, so the drive circuits may be selectively driven or adjusted according to needs during the operating process. In addition, the backlight module may use a direct-lit mode, which may enable the light emitted from the backlight module to have higher luminance, higher luminous efficiency, more uniform light and reduced dark regions of the backlight. Since the light emitted from the backlight module has higher luminance, when the light emitted from the backlight module reaches the finger and is reflected back by the finger to the fingerprint recognition element, the luminous intensity received by the fingerprint recognition element may also be higher, which may increase the fingerprint recognition precision. Moreover, the fingerprint recognition element may be arranged between two adjacent light-emitting elements, and there is no need to separately set a space for the fingerprint recognition element, thereby improving the space utilization rate.

Figure 3:
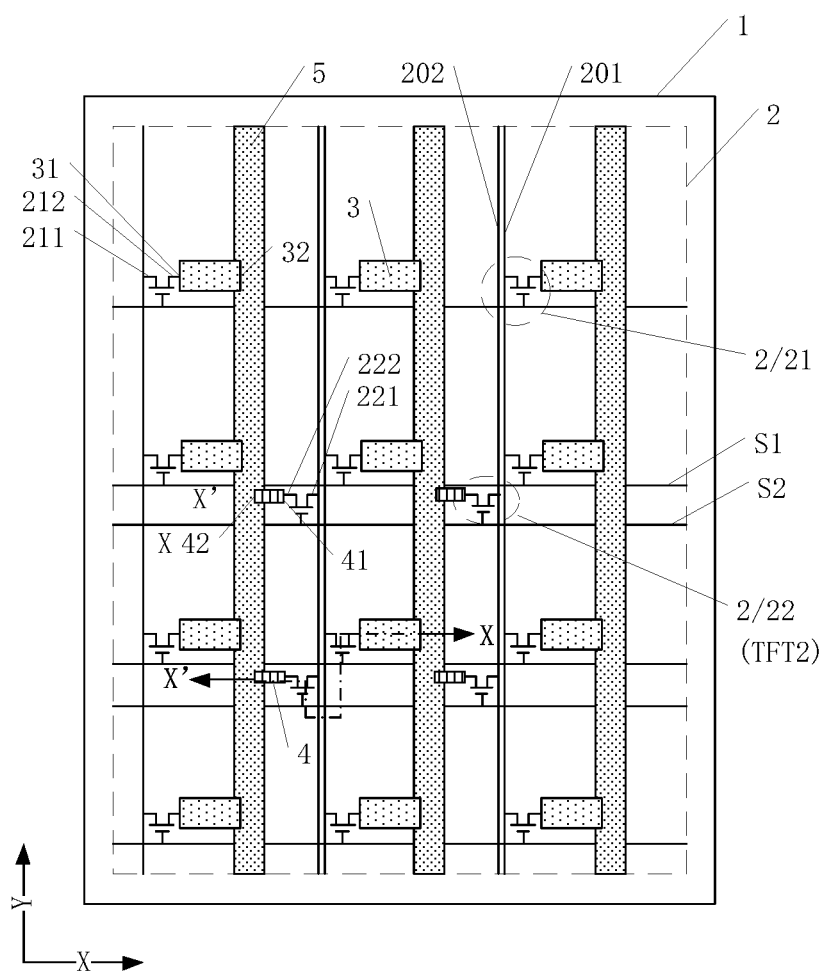
FIG. 3 illustrates a circuit connection schematic of an exemplary backlight module according to embodiments of the present disclosure.
Figure 4:
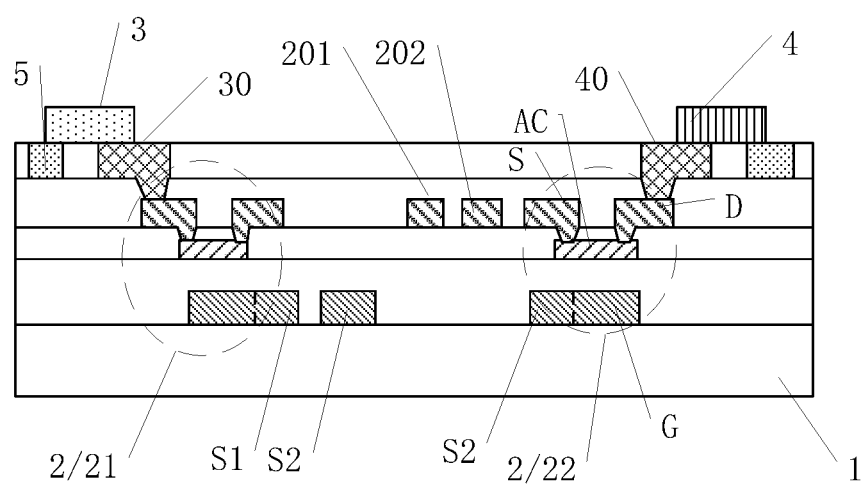
FIG. 4 illustrates a cross-sectional structural schematic of the exemplary backlight module provided in FIG. 3 along the cross-sectional line XX'.

Optionally, referring to FIG. 3 and FIG. 4, FIG. 3 illustrates a circuit connection schematic of an exemplary backlight module according to the embodiments of the present disclosure and FIG. 4 illustrates a cross-sectional structural schematic of the exemplary backlight module provided in FIG. 3 along the cross-sectional line XX'. For example, FIG. 3 illustrates a structural schematic of a drive circuit provided by the embodiments of the present disclosure. As shown in FIG. 3 and FIG. 4, the backlight module may further include a common signal electrode 5 which may be on a side of the drive circuit 2 adjacent to the light-emitting element 3. The drive circuit 2 may include a plurality of first signal lines 201 which may extend along the column direction Y and be arranged along the row direction X, where the row direction X may intersect the column direction Y. The first drive circuit 21 may include a first input terminal 211 and a first output terminal 212. The first input terminal 211 may be electrically connected to the first signal line 201 and the first output terminal 212 may be electrically connected to a first electrode 31 of the light-emitting element 3. A second electrode 32 of the light-emitting element 3 may be electrically connected to the common signal electrode 5. Optionally, the backlight module may further include a first drive electrode 30 which may be disposed in the same layer of the common signal electrode 5. Optionally, the first electrode 31 of the light-emitting element 3 may be soldered to the first drive electrode 30, and the second electrode 32 of the light-emitting element 3 may be soldered to the common signal electrode 5.

For example, as shown in FIG. 3 to FIG. 4, the backlight module may include the plurality of the common signal electrodes 5 which may be arranged along the row direction X and may extend along the column direction Y, and the plurality of the first signal lines 201. Optionally, the drive circuit 2 may further include a plurality of the first control lines S1 which may extend along the row direction X and may be arranged along the column direction Y. The first input terminal 211 of the first drive circuit 21 may be electrically connected to the first signal line 201, and the first output 212 may be electrically connected to the first electrode 31 of the light-emitting element 3, so the signal of the first signal line 201 may be transmitted to the light-emitting element 3 which may enable the light-emitting element 3 to function. Optionally, the first drive circuit 21 and the second drive circuit 22 may use an active drive method. Each of the light-emitting elements 3 may be set with a thin-film transistor and a storage capacitor correspondingly, and each of the fingerprint recognition elements 4 may also be set with a thin-film transistor and a storage capacitor correspondingly. It should be understood that only the active drive method may be used as an example for exemplary description in the embodiments of the present disclosure. Other drive methods may be also used in the embodiments of the present disclosure, which may not be described in detail in the present disclosure.

It should be noted that, in one embodiment, the first drive circuit 21, which may only include one thin-film transistor in FIG. 3, may only be used for illustrative description. In actual processes, the first drive circuit 21 may include two or more thin-film transistors and storage capacitors, etc. The specific circuit structure of the first drive circuit 21 may be described in detail hereafter.

In the backlight module provided by one embodiment, the first electrode of the light-emitting element may be soldered to the first output terminal of the first drive circuit, and the second electrode of the light-emitting element may be soldered to the common signal electrode. The specific structure of the first drive circuit may not affect the function of the light-emitting element, so more structures of the first drive circuit may be used in the backlight module provided by one embodiment, which may have better compatibility with the first drive circuit. Moreover, the light-emitting element may be directly soldered to the backlight module and the first drive circuit may be used to control the function of the light-emitting element, so the light-emitting element may be finely controlled as needed and the luminous effect of the light-emitting element may be more uniform. In addition, in the backlight module provided by one embodiment, the drive circuit may use the active drive mode and may have storage effect, so the light-emitting element and the fingerprint recognition element of the backlight module may be selectively driven or adjusted, and the circuit using the active drive method may have low power consumption and high integration.

Optionally, referring to FIG. 3 and FIG. 4, the drive circuit 2 may include a plurality of second signal lines 202 which may extend along the column direction Y and be arranged along the row direction X. The second drive circuit 22 may include a second input terminal 221 and a second output terminal 222. The second input terminal 221 may be electrically connected to the second signal line 202 and the second output terminal 222 may be electrically connected to a first electrode 41 of the fingerprint recognition element 4. A second electrode 42 of the fingerprint recognition element 4 may be electrically connected to the common signal electrode 5. Optionally, the backlight module may also include a second drive electrode 40 which may be disposed in the same layer of the common signal electrode 5. The first electrode 41 of the fingerprint recognition element 4 may be soldered to the second drive electrode 40, and the second electrode 42 of the fingerprint recognition element 4 may be soldered to the common signal electrode 5.

For example, as shown in FIG. 3 to FIG. 4, the backlight module may also include the plurality of the second signal lines 202. Optionally, the drive circuit 2 may further include a plurality of the second control lines S2 which may extend along the row direction X and may be arranged along the column direction Y. The second input terminal 221 of the second drive circuit 22 may be electrically connected to the second signal line 202 and the second output 222 may be electrically connected to the first electrode 41 of the fingerprint recognition element 4, so the detection signal of the fingerprint recognition element 4 may be transmitted to the second signal line 202, which may implement the fingerprint recognition.

It should be noted that, in one embodiment, the first drive circuit 22, which may only include one thin-film transistor in FIG. 3, may only be used for illustrative description. In actual processes, the second drive circuit 22 may also include a storage capacitor etc. The specific circuit structure of the second drive circuit 22 may be described in detail hereafter.

In the backlight module provided by one embodiment, the first electrode of the fingerprint recognition element may be soldered to the second output terminal of the second drive circuit, and the second electrode of the fingerprint recognition may be soldered to the common signal electrode. The specific structure of the second drive circuit may not affect the fingerprint recognition element to identify fingerprints, so more structures of the second drive circuit may be used in the backlight module provided by one embodiment, which may have better compatibility with the second drive circuit. Moreover, the fingerprint recognition element may be directly soldered to the backlight module, and the manufacturing process of the backlight module may be simple and have high feasibility, which may improve the manufacturing efficiency and save the manufacturing cost of the backlight module. In addition, in the backlight module provided by one embodiment, the drive circuit of the fingerprint recognition element may not be separately disposed, which may not only improve the space utilization rate of the backlight module, but also simplify the manufacturing process of the backlight module, and further improve the manufacturing efficiency of the backlight module.

Figure 5:
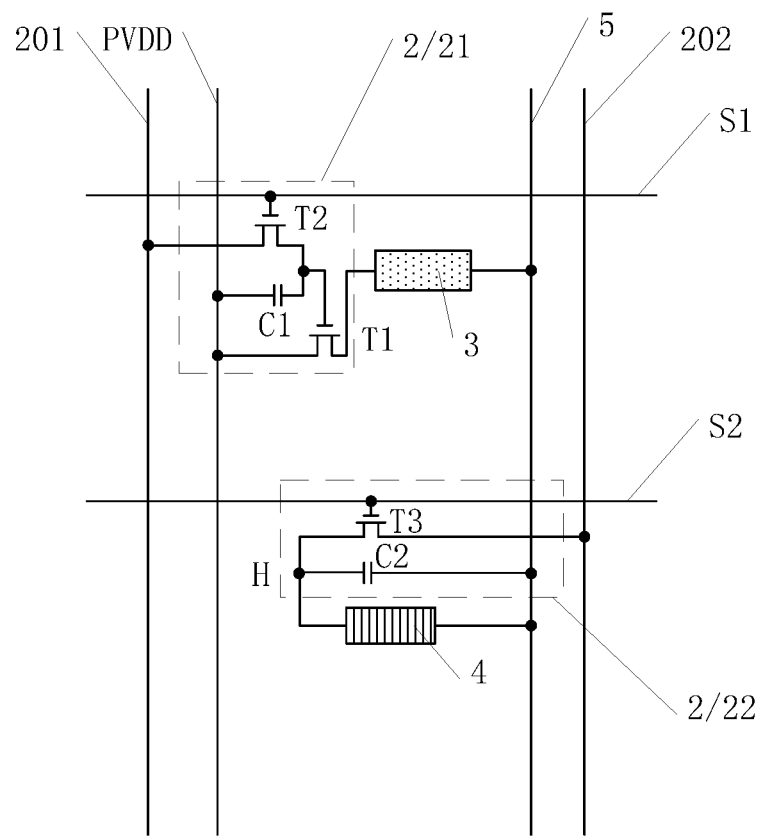
FIG. 5 illustrates a drive circuit structural schematic according to embodiments of the present disclosure.

It should be noted that, in order to clearly illustrate the technical solution of one embodiment, only one thin-film transistor may be used in FIG. 3 and FIG. 4 to show the first drive circuit 21 and the second drive circuit 22. As described above, the first drive circuit 21 may include two or more thin-film transistors and storage capacitors, etc. and the second drive circuit 22 may also include two or more thin-film transistors and storage capacitors, etc. in actual processes. The circuit structures of the first drive circuit 21 and the second drive circuit 22 may be described in detail hereafter. Referring to FIG. 5, FIG. 5 illustrates a drive circuit structural schematic according to embodiments of the present disclosure. As shown in FIG. 5, the drive circuit 2 may further include a base signal terminal PVDD (power voltage drain drain). The first drive circuit 21 may include two thin-film transistors T1, T2 and a capacitor C1. The second drive circuit 22 may include a capacitor C2 and a thin-film transistor T3. The base signal terminal PVDD may provide a high voltage signal (e.g., a constant voltage signal of 5V) and the common signal electrode 5 may provide a low voltage signal (e.g., a constant voltage signal of 0.5V).

In the first drive circuit 21, the control terminal of the thin-film transistor T2 may be electrically connected to the first control line S1. The first electrode of the thin-film transistor T2 may be electrically connected to the first signal line 201. The second electrode of the thin-film transistor T2 may be electrically connected to both the first electrode of the capacitor C1 and the control terminal of the thin-film transistor T1. The second electrode of the capacitor C1 may be electrically connected to the base signal terminal PVDD. The first electrode of the thin-film transistor T1 may be electrically connected to the base signal terminal PVDD and the second electrode of the thin-film transistor T1 may be electrically connected to the first electrode of the light-emitting element 3. The second electrode of the light-emitting element 3 may be electrically connected to the common signal electrode 5.

The working principle of the light-emitting element 3 may be described hereafter. The light-emitting element 3 may have two phases: a light-emitting preparation phase and a light-emitting phase. In the light-emitting preparation phase, the first control line S1 may be turned on and the thin-film transistor T2 may be turned on, so the signal of the first signal line 201 may be transmitted to the gate of the thin-film transistor T1 to charge the capacitor C1. In the light-emitting phase, the first control line S1 may be turned off and the capacitor C1 may discharge, so the thin-film transistor T1 may be kept in an ON status, thereby driving the light-emitting element 3 and enabling the light-emitting element 3 to emit light.

In the second drive circuit 22, the control terminal of the thin-film transistor T3 may be electrically connected to the second control line S2. The first electrode of the thin-film transistor T3 may be electrically connected to the second signal line 202. The second electrode of the thin-film transistor T3 may be electrically connected to both the first electrode of the capacitor C2 and the first electrode of the fingerprint recognition element 4. The second electrode of the capacitor C2 may be electrically connected to the common signal electrode 5 and the second electrode of the fingerprint recognition element 4 may be electrically connected to the common signal electrode 5.

The working principle of the fingerprint recognition element 4 may be described hereafter. The fingerprint recognition may include a preparation phase, a signal acquisition phase, and a signal detection phase. In the preparation phase, the second control line S2 may be turned on and T3 may be turned on, and the capacitor C2 may be charged until the charging of the capacitor C2 is completed. In the signal acquisition phase, the second control line S2 may be turned off and T3 may be cut-off. When the light emitted from the light-emitting element 3 illuminates on the finger and is reflected on the surface of the fingerprint to form reflected light, the reflected light may enter the fingerprint recognition element 4 and may be received by the fingerprint recognition element 4 to form photocurrent which may cause the potential change of the node H. In the signal detection phase, the amount of the potential change of the node H may be directly detected, thereby determining the magnitude of the photocurrent.

It can be understood that FIG. 5 may only be used as an example for illustrative description of the first drive circuit 21 and the second drive circuit 22 in one embodiment. The first drive circuit 21 may also include five, seven or other number of the thin-film transistors, and the second drive circuit may also use other drive structures according to different application requirements. The structures of the first drive circuit and the second drive circuit may not be limited according to various embodiments of the present disclosure.

As described above, in the backlight module provided by the embodiments of the present disclosure, the specific structure of the drive circuit may not affect the light emitting of the light-emitting element 3 and the fingerprint recognition of the fingerprint recognition element 4. Therefore, in order to clearly illustrate the technical solution of the present disclosure, the first drive circuit 21 and the second drive circuit 22 in the flowing expression may be represented by only using one thin-film transistor, but this may not represent that the first drive circuit 21 and the second drive circuit 22 may only include one thin-film transistor. In the actual processes, a specific circuit structure of the first drive circuit 21 and the second drive circuit 22 may refer to FIG. 5. Of course, the structure of the drive circuit may not be limited according to various embodiments of the present disclosure and may not be described in detail herein in the present disclosure.

Optionally, referring to FIG. 3 and FIG. 4, the fingerprint recognition element 4 may be disposed in the same layer of the light-emitting element 3.

In the backlight module provided by the embodiments of the present disclosure, the fingerprint recognition element and the light-emitting element may be disposed in the same layer, and the additional film layer structure or the manufacturing process may not be needed. The fingerprint recognition element may be electrically connected to the drive circuit, which may implement the fingerprint recognition function, simplify the manufacturing process, improve the manufacturing efficiency and save the manufacturing cost of the backlight module.

Figure 6:
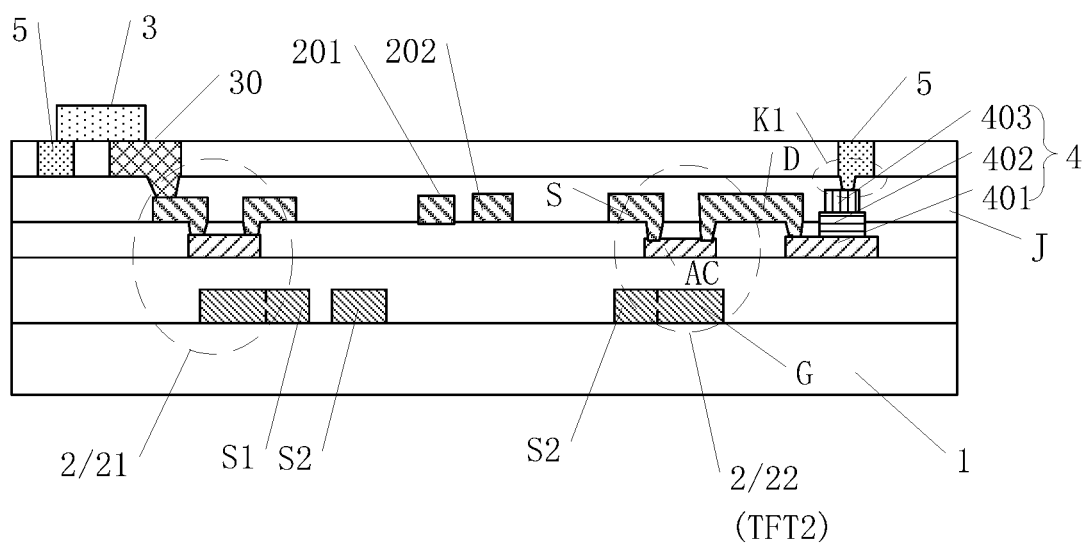
FIG. 6 illustrates another cross-sectional structural schematic of the exemplary backlight module provided in FIG. 3 along the cross-sectional line XX'.

Optionally, referring to FIG. 3 and FIG. 6, FIG. 6 illustrates another cross-sectional structural schematic of an exemplary backlight module provided in FIG. 3 along the cross-sectional line XX'. As shown in FIG. 3 and FIG. 6, the second drive circuit 22 may include at least one second thin-film transistor TFT2 which may include a gate G, a source S, a drain D, and an active layer AC. The fingerprint recognition element 4 may be a photosensitive diode which may include a first semiconductor portion 401, a second semiconductor portion 402, and an electrode portion 403. The first semiconductor portion 401 may be disposed in the same layer of the active layer AC. The second semiconductor portion 402 may be on a side of the first semiconductor portion 401 adjacent to the common signal electrode 5. The electrode portion 403 may be on a side of the second semiconductor portion 402 adjacent to the common signal electrode 5.

For example, as shown in FIG. 3 and FIG. 6, the fingerprint recognition element 4 may be controlled by the second thin-film transistor TFT2. Optionally, the fingerprint recognition element 4 may be a photosensitive diode which may include the first semiconductor portion 401, the second semiconductor portion 402, and the electrode portion 403. The first semiconductor portion 401 may be disposed in the same layer of the active layer AC of the second thin-film transistor TFT2. Optionally, an insulation layer J may be disposed on the source S and the drain D, which may prevent the source S and the drain D from being short-circuited by the above film structure. The thickness of the fingerprint recognition element 4 may not exceed the insulation layer J in a direction perpendicular to the backlight module.

In order to clearly illustrate the technical solution of the embodiments, the photosensitive diode may be briefly described herein. A photosensitive diode, also called a photodiode, is a photodetector capable of converting light into a current or voltage signal. The photosensitive diode may often use a PN junction with photosensitive characteristics. The PN junction may be very sensitive to light change, have unilateral conductivity, and change electrical characteristics according to different luminous intensity. Therefore, the luminous intensity may be used to change the current in a circuit.

It can be understood that a photosensitive diode, which is used as the fingerprint recognition element 4, may be used as an example for exemplary description in one embodiment. Other photoelectric sensors may also be used, which may not be described in detail herein.

In the backlight module provided by one embodiment, the fingerprint recognition element may be a photosensitive diode. The first semiconductor portion of the photosensitive diode may be disposed in the same layer of the active layer. The second semiconductor portion may be on the side of the first semiconductor portion away from the first substrate, and the electrode portion may be on the side of the second semiconductor portion away from the first semiconductor portion. That is, the film layer where the fingerprint recognition element is located may be the existing film layer in the backlight module and disposing the fingerprint recognition element may not additionally increase the film layer, which may ensure that the thickness of the backlight module is not affected and may improve the quality of the backlight module. Moreover, the fingerprint recognition element may not exceed the insulation layer, which may ensure the surface flatness of the backlight module and may be advantageous to improve the performance of the backlight module.

It can be understood that only the thin-film transistor of the bottom gate structure (that is, the gate G may be on the side of the active layer AC adjacent to the first substrate 1) shown in FIG. 4 and FIG. 6 may be used as an example for illustrative description in one embodiment, and the thin-film transistor of the top gate structure (the gate G may be on the side of the active layer AC away from the first substrate 1) may also be used, which may not be specifically limited according to various embodiments of the present disclosure.

Optionally, referring to FIG. 3 and FIG. 6, the electrode portion 403 may be electrically connected to the common signal electrode 5 through the first via K1, and the drain D of the second thin-film transistor TFT2 may be electrically connected to the first semiconductor portion 401 of the fingerprint recognition element 4.

For example, referring to FIG. 3 and FIG. 6, the drain D of the second thin-film transistor TFT2 may directly extend to the position of the first semiconductor portion 401 and may be electrically connected to the first semiconductor portion 401 directly.

In the backlight module provided by one embodiment, the drain of the second thin-film transistor may be directly connected to the first semiconductor portion, which may improve the transmission speed and reliability of the fingerprint recognition signal, and improve the fingerprint recognition effect, thereby improving the performance of the backlight module.

Figure 7:
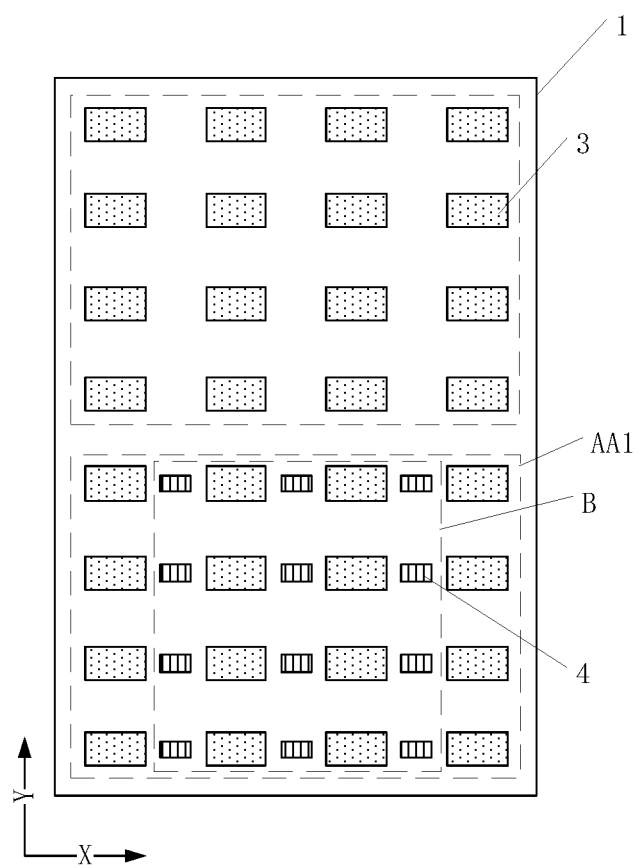
FIG. 7 illustrates a planar structural schematic of another exemplary backlight module according to embodiments of the present disclosure.

Optionally, referring to FIG. 7, FIG. 7 illustrates a planar structural schematic of another exemplary backlight module according to embodiments of the present disclosure. As shown in FIG. 7, the backlight module may include a plurality of backlight sub-regions AA1 and at least one fingerprint sensing region B. The plurality of light-emitting elements 3 may be disposed in each backlight sub-region AA1 and the plurality of fingerprint recognition elements 4 may be disposed in each fingerprint sensing region B. The fingerprint sensing region B may overlap with at least one backlight sub-region AA1.

For example, as shown in FIG. 7, the backlight module may include two backlight sub-regions AA1 and one fingerprint sensing region B, where one backlight sub-region AA1 may overlap with the fingerprint sensing region B. It can be understood that, in one embodiment, FIG. 7 may be used only as an example for exemplary description of the backlight sub-regions and the fingerprint sensing region. The number of the backlight sub-regions and the fingerprint sensing regions included in the backlight module, the number of the light-emitting elements in the backlight sub-regions and the number of the fingerprint recognition elements in the fingerprint recognition regions may not be specifically limited according to various embodiments of the present disclosure.

In the backlight module provided by one embodiment, the fingerprint sensing region may overlap with at least one backlight sub-region, that is, the backlight module provided by one embodiment may implement local fingerprint recognition. When the light of the backlight sub-region is emitted from the backlight module and reflected by a finger back to the fingerprint recognition element, since the fingerprint sensing region overlaps with the backlight sub-region, the intensity of the reflected light received by the fingerprint recognition element may be relatively large, thereby improving the fingerprint recognition precision. In addition, the fingerprint recognition element may be arranged between two adjacent light-emitting elements, and the fingerprint recognition element may be disposed without requiring additional space, thereby improving the space utilization rate of the backlight module.

It should be noted that the arrangements of the fingerprint sensing regions and the backlight sub-regions may be various ways. In one embodiment, FIG. 7 may only be used as an example for description of one specific arrangement of the light-emitting elements 3 and the fingerprint recognition elements 4, and other arrangements may also be used, which may not be described in detail herein.

It can be understood that FIG. 7 may only be used as an example for illustrative description of the overlapping of the fingerprint recognition region and one backlight sub-region in one embodiment. In the local fingerprint recognition, the overlapping of the fingerprint sensing regions and the backlight sub-regions may be various ways. For example, the fingerprint sensing region may occupy ¼ of the area of the backlight module or ½ of the area of the backlight module, which may not be specifically limited according to various embodiments of the present disclosure.

Figure 8:
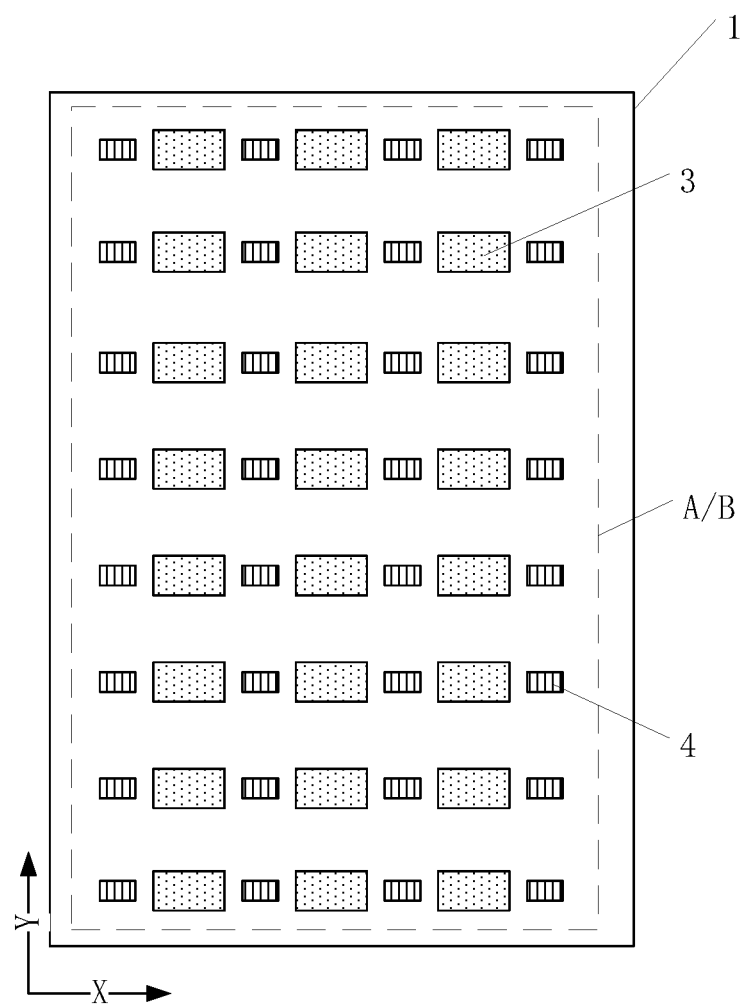
FIG. 8 illustrates a planar structural schematic of another exemplary backlight module according to embodiments of the present disclosure.

Optionally, referring to FIG. 8, FIG. 8 illustrates a planar structural schematic of another exemplary backlight module according to embodiments of the present disclosure. As shown in FIG. 8, the backlight module may include a backlight region A and a fingerprint sensing region B. The plurality of light-emitting elements 3 may be disposed in the backlight region A and the plurality of fingerprint recognition elements 4 may be disposed in the fingerprint sensing region B, where the fingerprint sensing region B may overlap with the backlight region A.

For example, as shown in FIG. 8, all light-emitting elements 3 of the backlight module may form the backlight region A and all fingerprint recognition elements 4 of the backlight module may form the fingerprint sensing region B, where the backlight region A may overlap with the fingerprint sensing region B. That is, the fingerprint recognition may be performed on the entire backlight region in the backlight module provided by one embodiment.

It should be understood that, in one embodiment, FIG. 8 may only be used as exemplary illustration of the backlight sub-regions and the fingerprint sensing regions. The number of the backlight sub-regions and the fingerprint sensing regions included in the backlight module, the number of the light-emitting elements in the backlight sub-regions and the number of the fingerprint recognition elements in the fingerprint recognition regions may not be specifically limited according to various embodiments of the present disclosure. It should be noted that the arrangements of the fingerprint sensing regions and the backlight sub-regions may be various ways. In one embodiment, FIG. 8 may only be used as an example for exemplary description of one specific arrangement of the light-emitting elements 3 and the fingerprint recognition elements, and other arrangements may also be used, which may not be described in detail herein.

In the backlight module provided by one embodiment, the fingerprint sensing region may overlap with the backlight region, that is, the fingerprint recognition may be performed on the entire backlight region, which may improve the performance of the fingerprint recognition of the backlight module, improve the quality of the fingerprint recognition of the backlight module, and improve the quality of user experience.

Figure 9:
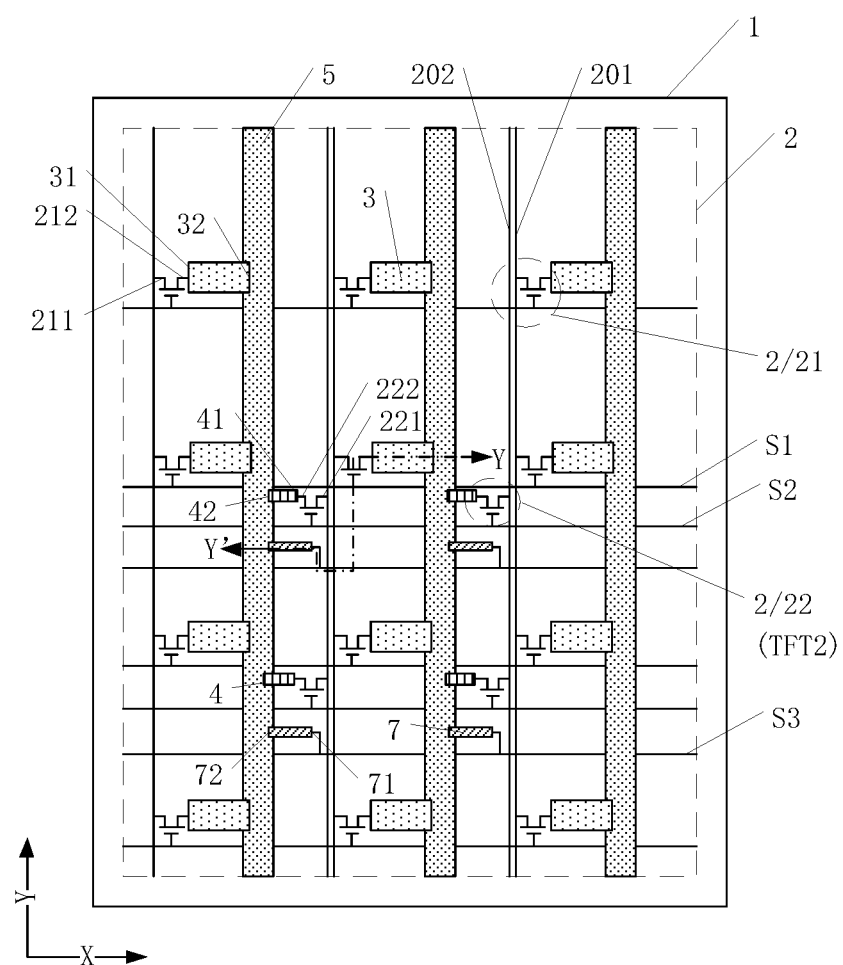
FIG. 9 illustrates a circuit connection schematic of another exemplary backlight module according to embodiments of the present disclosure.
Figure 10:
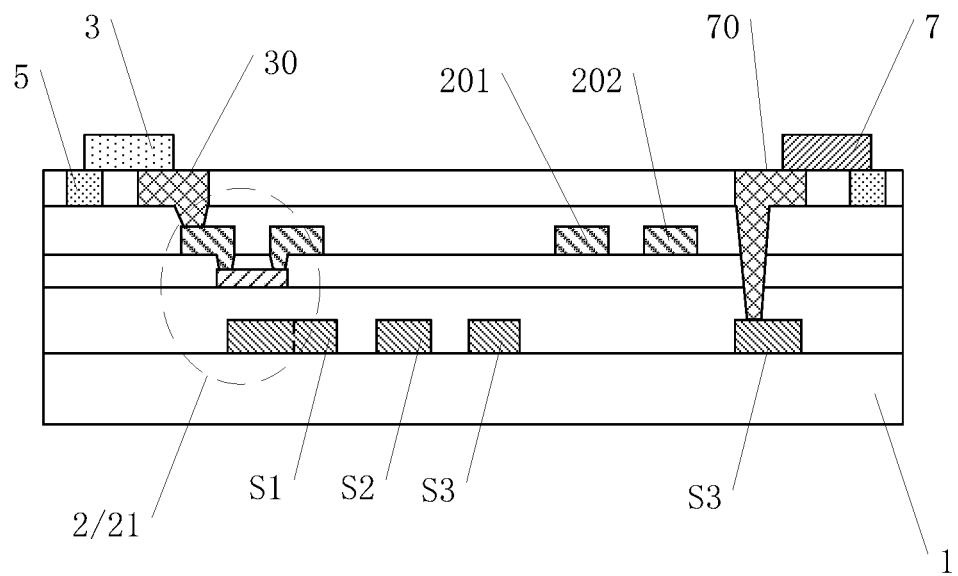
FIG. 10 illustrates a cross-sectional structural schematic of the exemplary backlight module provided in FIG. 9 along the cross-sectional line YY'.

Optionally, referring to FIG. 9 and FIG. 10, FIG. 9 illustrates a circuit connection schematic of another exemplary backlight module according to embodiments of the present disclosure. FIG. 10 illustrates a cross-sectional structural schematic of an exemplary display device provided in FIG. 9 along the cross-sectional line YY'. The backlight module may also include a plurality of infrared emitters 7 which may be disposed in the same layer of the light-emitting elements 3. The drive circuit 2 may include a plurality of the third control lines S3 which may extend in the row direction X. The plurality of the third control lines S3 may be arranged along the column direction Y. A first electrode 71 of the infrared emitter 7 may be electrically connected to the third control line S3, and a second electrode 72 of the infrared emitter 7 may be electrically connected to the common signal electrode 5. Optionally, the drive circuit 2 may further include the plurality of the third control lines S3 which may extend along the row direction X and may be arranged along the column direction Y. The infrared emitter 7 may be electrically connected to the third control line S3 through the third drive electrode 70.

For example, as shown in FIG. 9-10, in the backlight module provided by one embodiment, the infrared emitter 7 may be set in a peripheral region of the fingerprint recognition element 4. The first electrode 71 of the infrared emitter 7 may be electrically connected to the third control line S3 and the second electrode 72 of the infrared emitter 7 may be electrically connected to the common signal electrode 5. The infrared light emitted from the infrared emitter 7 may be reflected by a finger to the fingerprint recognition element 4, thereby implementing the fingerprint recognition.

It should be noted that, in one embodiment, the first drive circuit 21 including only one thin-film transistor and the second drive circuit 22 including one thin-film transistor in FIG. 9 may be only used as an example for illustrative description. As described above, in actual processes, the first drive circuit 21 may include two or more thin-film transistors and capacitors, etc. and the second drive circuit 22 may include two or more thin-film transistor and capacitors, etc. The circuit structures of the first drive circuit 21 and the second drive circuit 22 may not be specifically limited according to various embodiments of the present disclosure.

In the backlight module provided by one embodiment, the infrared light emitted from the infrared emitters may be used as the light sources of the fingerprint recognition elements. Using the infrared light for the fingerprint recognition may be less affected by external ambient light and light inside the backlight module, may have advantages of smaller power consumption and higher recognition precision, and may improve the performance of the fingerprint recognition of the backlight module.

Figure 11:
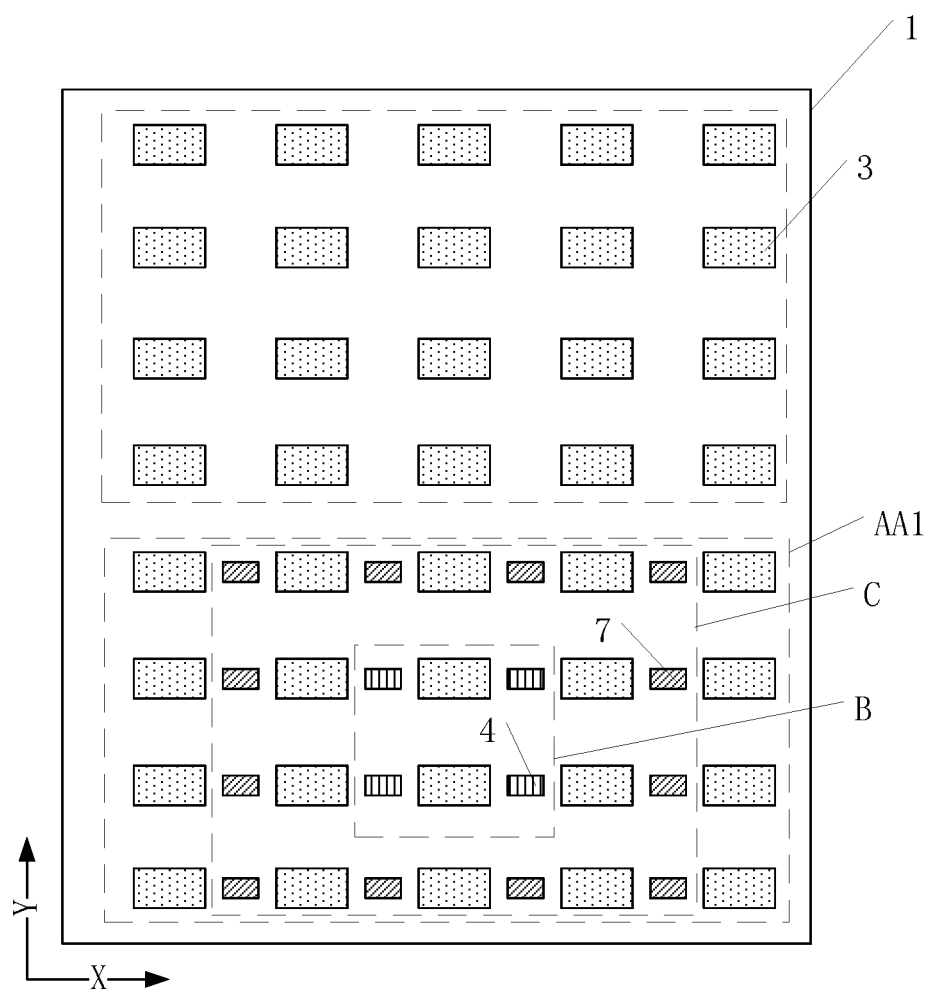
FIG. 11 illustrates a planar structural schematic of another exemplary backlight module according to embodiments of the present disclosure.

Optionally, referring to FIG. 11, FIG. 11 illustrates a planar structural schematic of another exemplary backlight module according to embodiments of the present disclosure. As shown in FIG. 11, the backlight module may include a plurality of backlight sub-regions AA1, at least one fingerprint sensing region B and at least one infrared emitting region C. The plurality of light-emitting elements 3 may be disposed in each backlight sub-region AA1 and the plurality of fingerprint recognition elements 4 may be disposed in each fingerprint sensing region B. The fingerprint sensing region B may overlap with at least one backlight sub-region AA1. The plurality of the infrared emitters 7 may be disposed in each infrared emitting region C. The infrared emitting region C may partially overlap with the fingerprint sensing region B.

For example, as shown in FIG. 11, the backlight module may include two backlight sub-regions AA1, one fingerprint sensing region B and one infrared emitting region C. The fingerprint sensing region B may overlap with one the backlight sub-region AA1 and the fingerprint sensing region may also overlap with the infrared emitting region C. It should be understood that, in one embodiment, FIG. 11 may only be used as an example for exemplary description of the backlight sub-regions, the fingerprint sensing regions and the infrared emitting regions. The number of the backlight sub-regions, the fingerprint sensing regions and the infrared emitting regions included in the backlight module, the number of the light-emitting elements in the backlight sub-regions, the number of the fingerprint recognition elements in the fingerprint recognition regions and the number of the infrared emitters in the infrared emitting regions may not be specifically limited in according to various embodiments of the present disclosure.

In the backlight module provided by one embodiment, the fingerprint sensing region may at least partially overlap with the infrared emitting region. When the infrared light emitted from the infrared emitter is emitted from the backlight module and reflected by a finger back to the fingerprint recognition element, since the fingerprint sensing region overlaps with the infrared emitting region, the intensity of the reflected light received by the fingerprint recognition element may be relatively large, and the infrared light emitted from the infrared emitter may be ensured to have higher utilization rate, thereby improving the precision of the fingerprint recognition. In addition, the fingerprint recognition element and the infrared emitter may be arranged between two adjacent light-emitting elements, and the fingerprint recognition element and the infrared emitter may be disposed without requiring additional space, thereby improving the space utilization rate of the backlight module.

It should be noted that the arrangements of the light-emitting elements 3, the fingerprint recognition elements 4 and the infrared emitters 7 may be various ways. In one embodiment, FIG. 11 may only be used as an example for one specific arrangement of the light-emitting elements 3, the fingerprint recognition elements 4 and the infrared emitters 7, and other arrangements may also be used, which may not be described in detail herein.

It can be understood that, in one embodiment, FIG. 11 may only be used as an example for illustrative description of the positional relationship between the infrared emitting regions, the fingerprint sensing regions and the backlight sub-regions. The fingerprint sensing region may also overlap with two or more backlight sub-regions. For example, the fingerprint sensing region may occupy ¼ of the area or ½ of the area of the backlight module according to actual needs. Correspondingly, the infrared emitting region may overlap with two or more fingerprint sensing regions, which may not be specifically limited according to various embodiments of the present disclosure.

Optionally, referring to FIG. 11, the plurality of the fingerprint recognition elements 4 in the fingerprint sensing region B may be arranged in an array structure and the plurality of the infrared emitters 7 may be disposed surrounding the fingerprint sensing region B.

For example, as shown in FIG. 11, the infrared emitting region C may be set surrounding the fingerprint sensing region B, that is, the infrared emitters 7 may not be disposed inside the fingerprint sensing region, and the infrared emitters 7 may be disposed surrounding the fingerprint sensing region B.

In the backlight module provided by one embodiment, the infrared emitting region may be set surrounding the fingerprint sensing region. When the infrared light, emitted from the infrared emitter, is emitted from the backlight module and reflected by a finger back to the fingerprint recognition element, since the infrared emitting region is set surrounding the fingerprint sensing region, the intensity of the reflected light received by the fingerprint recognition element may be relatively large and the intensity of the reflected light received by each fingerprint recognition element may be relatively uniform, which may further increase the utilization rate of the infrared light, increase the infrared light that the fingerprint recognition element may receive, and further improve the precision of the fingerprint recognition.

Figure 12:
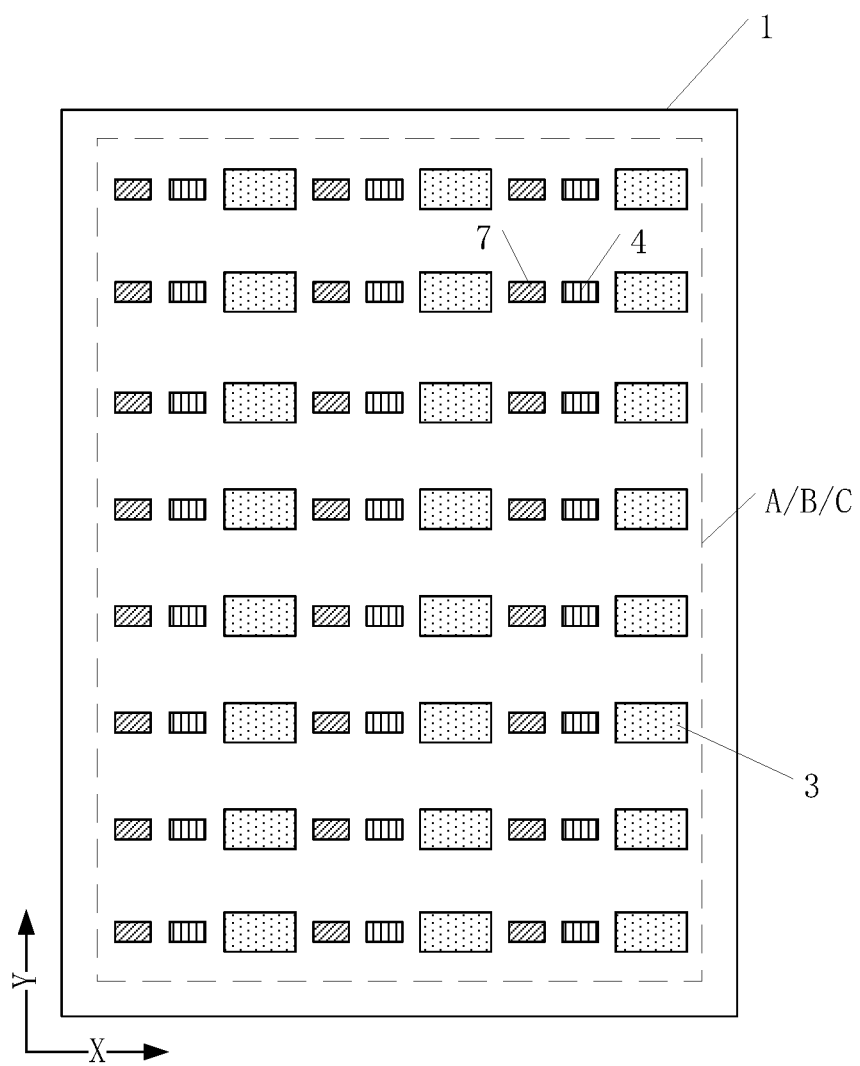
FIG. 12 illustrates a planar structural schematic of another exemplary backlight module according to embodiments of the present disclosure.

Optionally, referring to FIG. 12, FIG. 12 illustrates a planar structural schematic of another exemplary backlight module according to embodiments of the present disclosure. As shown in FIG. 12, the backlight module may include a backlight region A, a fingerprint sensing region B and an infrared emitting region C. The plurality of the light-emitting elements 3 may be disposed in the backlight region A. The plurality of the fingerprint recognition elements 4 may be disposed in the fingerprint sensing region B. The plurality of the infrared emitters 7 may be disposed in the infrared emitting region C. The backlight region A may overlap with each of the fingerprint sensing region B and the infrared emitting region C, that is, in the backlight module provided by one embodiment, the infrared emission may cover the entire backlight module and more positions of the entire backlight module may be used for the fingerprint recognition.

It should be understood that, in one embodiment, FIG. 12 may only be used as an example for exemplary description of the backlight region, the fingerprint sensing region and the infrared emitting region. The number of the backlight regions, the fingerprint sensing regions and the infrared emitting regions included in the backlight module, the number of the light-emitting elements in the backlight regions, the number of the fingerprint recognition elements in the fingerprint sensing regions and the number of the infrared emitters in the infrared emitting regions may not be specifically limited according to various embodiments of the present disclosure.

It should be noted that the arrangements of the light-emitting elements 3, the fingerprint recognition elements 4 and the infrared emitters 7 may be various ways. In one embodiment, FIG. 12 may only be used as an example of a specific arrangement of the light-emitting elements 3, the fingerprint recognition elements 4 and the infrared emitters 7, and other arrangements may also be used, which may not be described in detail herein.

In the backlight module provided by one embodiment, the infrared emitting region, the fingerprint sensing region and the backlight region may overlap with each other, that is, the fingerprint recognition may be performed on the entire backlight region, which may improve the user experience. The entire backlight region may be disposed with infrared emitters to provide light sources for the fingerprint recognition elements. When the infrared light emitted from the infrared emitter is emitted from the backlight module and reflected by a finger back to the fingerprint recognition element, since the infrared emitting region covers the whole surface, the intensity of the reflected light received may be relatively large regardless of the positions of the fingerprint recognition elements in the backlight module, which may further improve the precision and performance of the fingerprint recognition.

Figure 13:
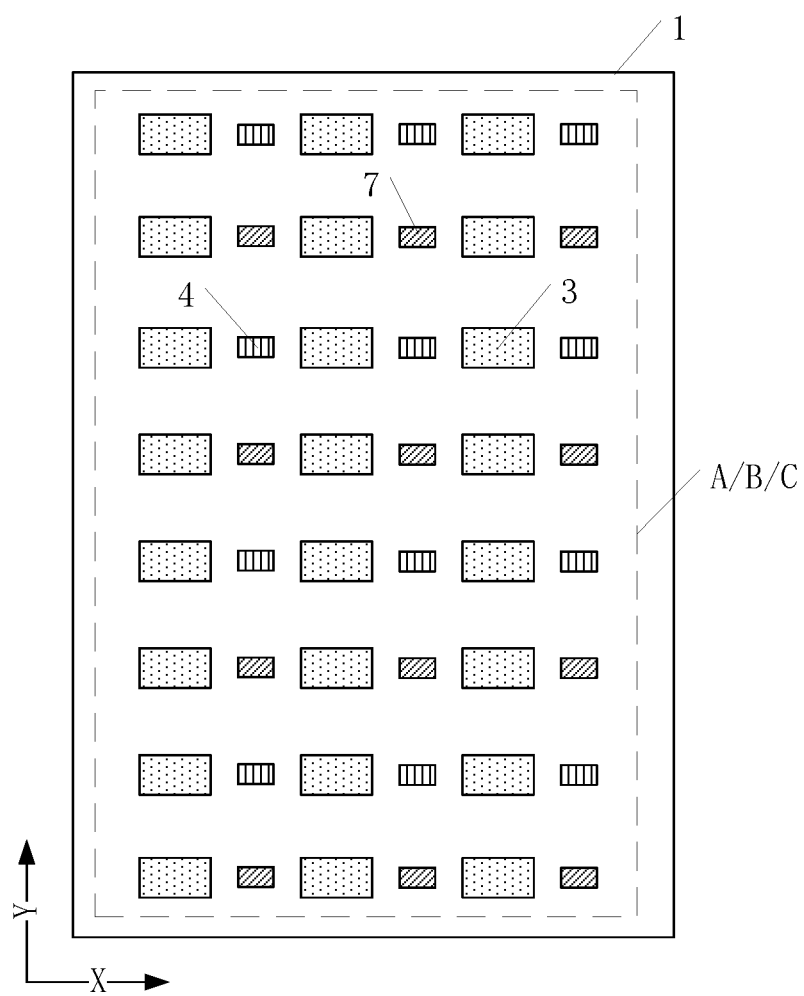
FIG. 13 illustrates a planar structural schematic of another exemplary backlight module according to embodiments of the present disclosure.

Optionally, referring to FIG. 13, FIG. 13 illustrates a planar structural schematic of another exemplary backlight module according to embodiments of the present disclosure. As shown in FIG. 13, for the adjacent two rows of the light-emitting elements 3, one row of the light-emitting elements 3 and the fingerprint recognition elements 4 may be alternatively arranged in the row direction X, and another row of the light-emitting elements 3 and the infrared emitters 7 may be alternatively arranged in the row direction X. The fingerprint recognition elements 4 and the infrared emitters 7 may be located in two adjacent columns of the light-emitting elements, and the fingerprint recognition elements 4 and the infrared emitters 7 may be alternatively arranged along the column direction Y. It should be noted that the arrangements of the light-emitting elements 3, the fingerprint recognition elements 4 and the infrared emitters 7 may be various ways. In one embodiment, FIG. 13 may only be used as an example of a specific arrangement of the light-emitting elements 3, the fingerprint recognition elements 4 and the infrared emitters 7, and other arrangements may also be used, which may not be described in detail herein.

In the backlight module provided by one embodiment, the fingerprint recognition elements and the infrared emitters may be alternatively arranged between two adjacent columns of the light-emitting elements, which not only does not need to separately set the space for the fingerprint recognition elements and the infrared emitters, but also make the gap between the two rows of light-emitting elements relatively small and improve the space utilization rate. The infrared emitters may cover the entire backlight region and the intensity of the infrared light may be improved, so the reflected light received of the fingerprint recognition elements may be stronger and the precision of the fingerprint recognition may be improved. The fingerprint recognition elements may cover the entire backlight region and may recognize fingerprints in more regions, which may improve the user experience. The fingerprint recognition elements and the infrared emitters may be evenly distributed in the backlight region. When the infrared light, emitted from the infrared emitter, is emitted from the backlight module and reflected by a finger back to the fingerprint recognition element, since the infrared emitters and the fingerprint recognition elements are evenly distributed, the intensity of the reflected light received may be relatively uniform regardless of the positions of the fingerprint recognition elements in the backlight module, which may improve the fingerprint recognition effect.

The embodiments of the present disclosure provide a display device, including a backlight module 1000A provided by the present disclosure and a display panel 1000B which may be disposed opposite to the backlight module.

Figure 14:
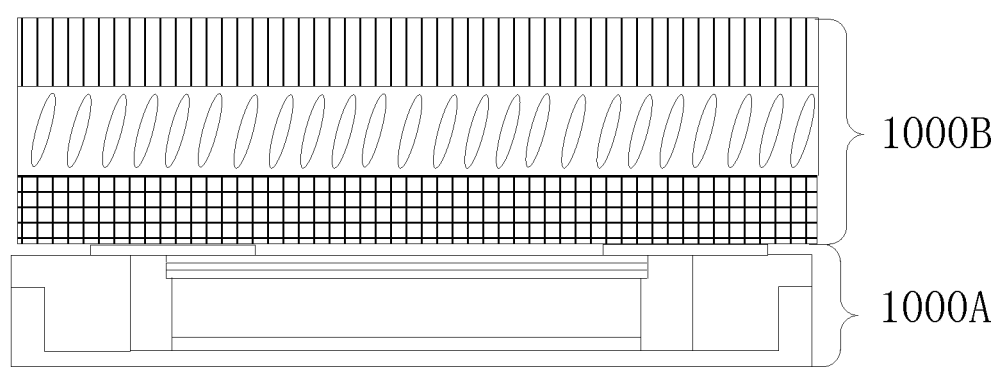
FIG. 14 illustrates a cross-sectional structural schematic of an exemplary display device according to embodiments of the present disclosure.

For example, referring to FIG. 14, FIG. 14 illustrates a cross-sectional structural schematic of an exemplary display device according to embodiments of the present disclosure. The display device 1000 provided in FIG. 14 may include the backlight module 1000A provided by any above-mentioned embodiments of the present disclosure. It should be understood that the backlight module 1000A may further include other film layers such as a diffuser plate, which may not be specifically limited according to various embodiments of the present disclosure. The display panel may be a liquid crystal display panel. It should be understood that the display device provided by the embodiments of the present disclosure may also be a display device having a display function, such as a mobile phone, a watch, a computer, a television, an in-vehicle display, etc., which may not be specifically limited according to various embodiments of the present disclosure. The display device provided by the embodiments of the present disclosure may have beneficial effects of the backlight module provided by the embodiments of the present disclosure, and the details may refer to the detailed description of the backlight module in the above-mentioned embodiments, which may not be described in one embodiment herein.

Figure 15:
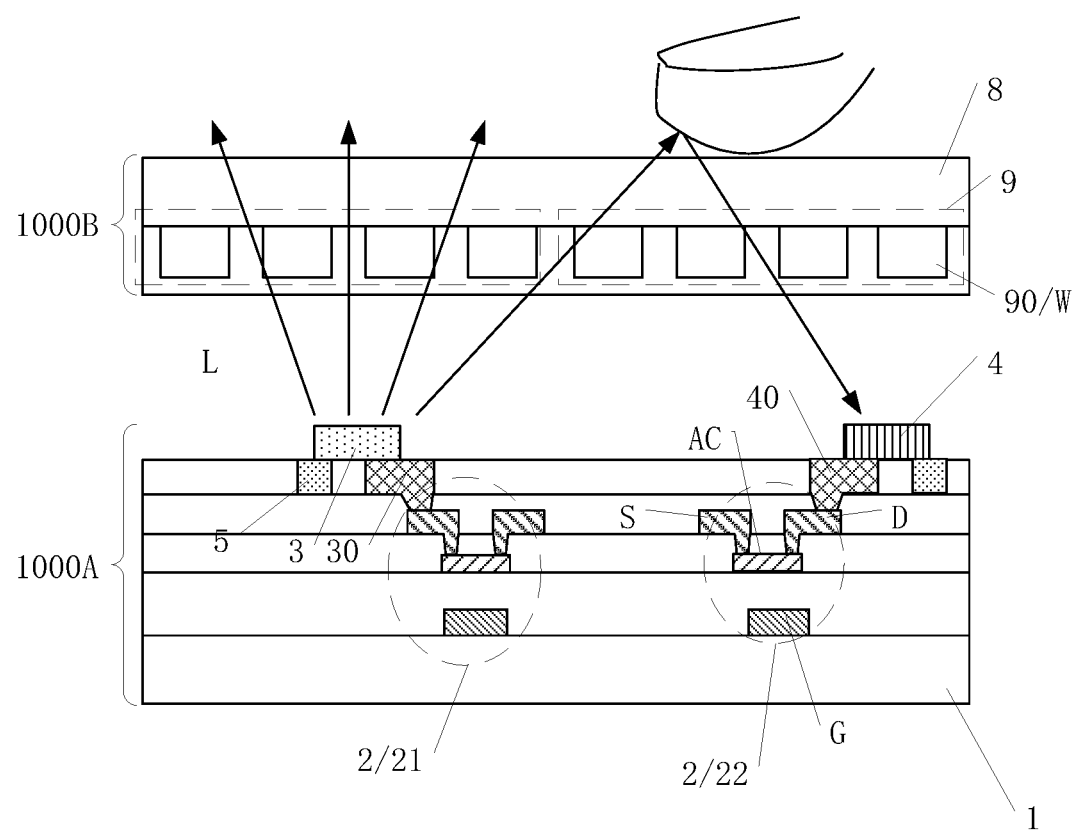
FIG. 15 illustrates a cross-sectional structural schematic of another exemplary display device according to embodiments of the present disclosure.

Optionally, referring to FIG. 15, FIG. 15 illustrates a cross-sectional structural schematic of another exemplary display device according to embodiments of the present disclosure. As shown in FIG. 15, the display panel may include a second substrate 8 and a plurality of pixel units 9 on the second substrate 8. The plurality of the pixel units 9 may be on a side of the second substrate 8 adjacent to the light-emitting elements 3. The pixel unit 9 may include a plurality of sub-pixels 9. The orthographic projection of the fingerprint recognition element 4 on the first substrate 1 may at least partially overlap with the orthographic projection of a pixel unit 9 on the first substrate 1.

For example, as shown in FIG. 15, the light L emitted from the light-emitting element 3 on the backlight module may exit from the display panel 1000B, and the light L may be reflected back to the fingerprint recognition element 4 after the finger touches the display device. In addition, the fingerprint recognition element 4 may partially overlap with the pixel unit 9 along a direction perpendicular to the display device, that is, the fingerprint recognition element 4 may be located directly below the pixel unit 9. Optionally, the display device may include a black matrix (not shown), where the fingerprint recognition element 4 may not overlap with the black matrix along the direction perpendicular to the display device.

In the display device provided by one embodiment, the fingerprint recognition element may at least partially overlap with the pixel unit. Since the light intensity of the region where the pixel unit is located is relatively large, the light intensity of the reflected light received by the fingerprint recognition element may also be relatively large, which may improve the precision of the fingerprint recognition. In addition, when the light emitted from the light-emitting element forms the reflected light on the surface of the finger and the reflected light is reflected back to the fingerprint recognition element, the reflected light may only pass through the pixel unit and may not pass through the black matrix, which may prevent the reflected light from being blocked, and may be advantageous for the fingerprint recognition element to receive signals and improve the sensitivity of the fingerprint recognition.

Optionally, referring to FIG. 15, the pixel unit 9 may include at least one white sub-pixel W.

In the display device provided by one embodiment, the pixel unit may include the white sub-pixel. The color resist of the white sub-pixel is set to be transparent, so the light transmittance may be higher than other color resists and the light intensity emitted from the display panel may be larger. Therefore, the light intensity of the reflected light received by the fingerprint recognition element may be also larger, which may further improve the precision of the fingerprint recognition and increase the sensitivity of the fingerprint recognition.

Figure 16:
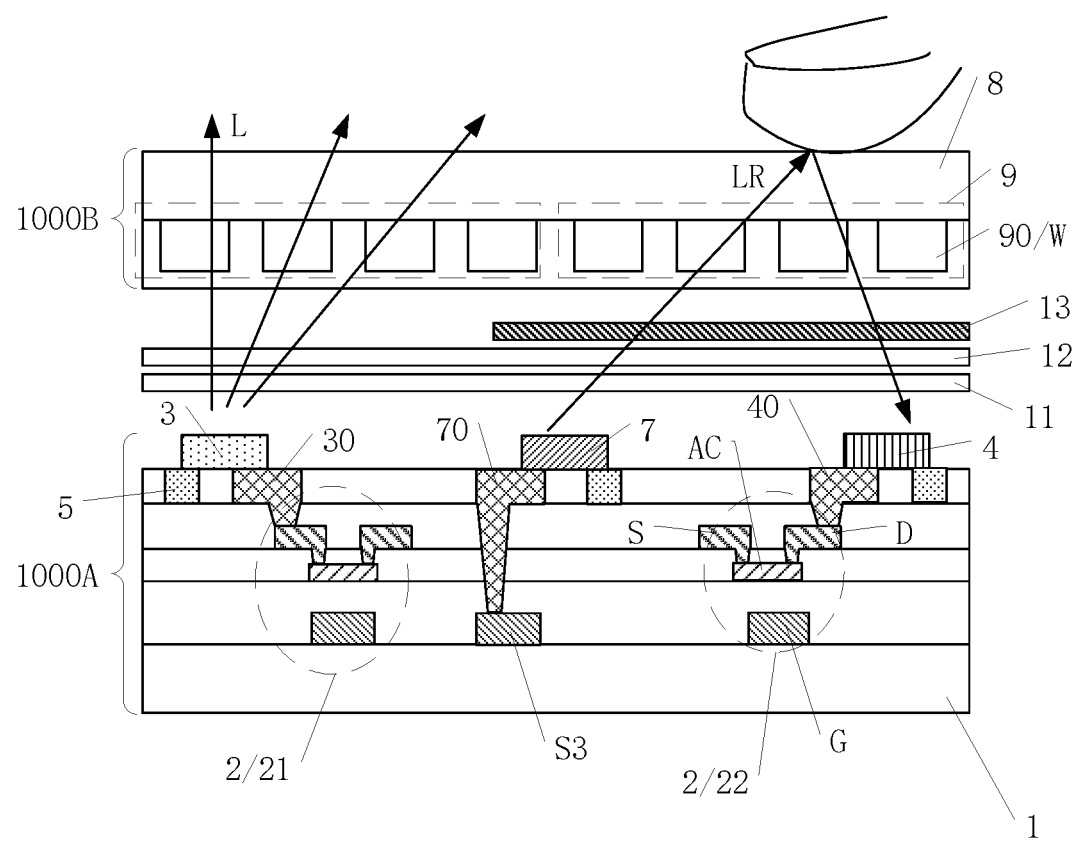
FIG. 16 illustrates a cross-sectional structural schematic of another exemplary display device according to embodiments of the present disclosure.

Optionally, referring to FIG. 16, FIG. 16 illustrates a cross-sectional structural schematic of another exemplary display device according to embodiments of the present disclosure. As shown in FIG. 16, the display device may further include a diffuser plate 11, a brightness enhancement film 12 and an infrared anti-reflection film 13. The diffuser plate 11 may be on a side of the light-emitting element 3 away from the first substrate 1. The brightness enhancement film 12 may be on a side of the diffuser plate 11 away from the first substrate 1. The infrared anti-reflection film 13 may be on a side of the brightness enhancement film 12 away from the first substrate 1.

For example, as shown in FIG. 16, the light L emitted from the light-emitting element 3 may emit from the backlight module 1000A and may illuminate the display panel 1000B. The infrared light LR emitted from the infrared emitter 7 may also emit from the backlight module 1000A and pass through the display panel 1000B. When a finger touches the display panel 1000B, the infrared light LR may form the reflected light on the finger surface, and the reflected light may be reflected to the fingerprint recognition element 4 and may be received by the fingerprint recognition element 4, thereby implementing the fingerprint recognition.

In the display device provided by one embodiment, the display device may include the diffuser plate, the brightness enhancement film and the infrared anti-reflection film. The diffuser plate may use a material with high light transmittance such as plastic, which may be used together with a backlight source to provide a uniform surface source for the display panel. The brightness enhancement film may use a prism structure, which may improve the luminous efficiency of the entire backlight module. The infrared anti-reflection film may increase the intensity of the transmitted infrared light and improve the utilization rate of the infrared light. When the infrared light is used as the light source of the fingerprint recognition element in the display device, the infrared light anti-reflection film together with the infrared light source may further improve the precision of the fingerprint recognition.

Optionally, referring to FIG. 16, the infrared anti-reflection film 13 may at least partially cover the brightness enhancement film 12. Optionally, both orthographic projections of the infrared emitter 7 and the fingerprint recognition element 4 on the first substrate 1 may be within the orthographic projection of the infrared anti-reflection film 13 on the first substrate 1.

In the display device provided by one embodiment, the infrared anti-reflection film may be disposed in a region where the infrared emitter and the fingerprint recognition element are disposed, which may save partial infrared anti-reflection film and reduce the cost of the display device. In addition, in the portion where the infrared anti-reflection film is not disposed, the light emitted from the light-emitting element 3 may pass through fewer layers, which may increase the light transmittance of the light-emitting element.

Figure 17:
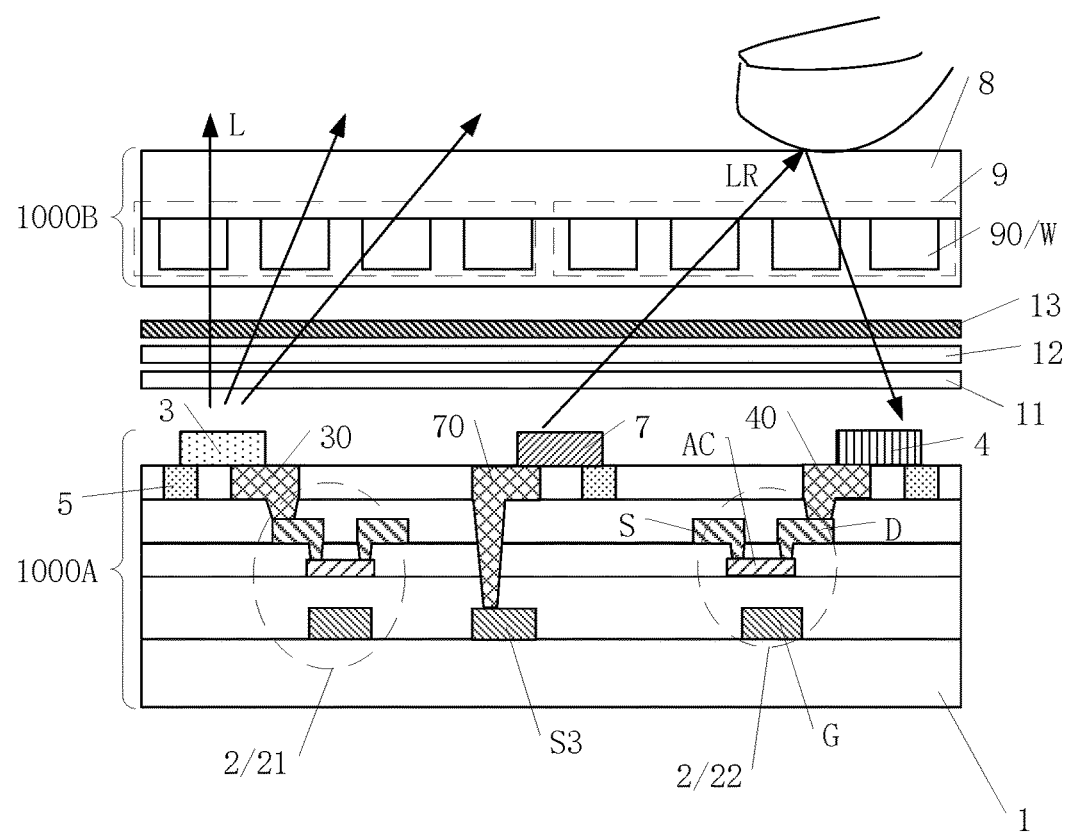
FIG. 17 illustrates a cross-sectional structural schematic of another exemplary display device according to embodiments of the present disclosure.

Optionally, referring to FIG. 17, FIG. 17 illustrates a cross-sectional structural schematic of another exemplary display device according to embodiments of the present disclosure. As shown in FIG. 17, an orthographic projection of the infrared anti-reflection film 13 on the brightness enhancement film 12 may cover the entire surface of the brightness enhancement film 12.

In the display device provided by one embodiment, the orthographic projection of the infrared anti-reflection film on the brightness enhancement film may cover the entire surface of the brightness enhancement film, which may not only improve the flatness of the display device, but also improve the penetration intensity of the infrared light of the entire display device, thereby improving the precision of the fingerprint recognition. In addition, the orthographic projection of the infrared anti-reflection film on the brightness enhancement film may cover the entire surface of the brightness enhancement film, which may improve the surface flatness of the display device and improve the performance of the display device.

Figure 18:
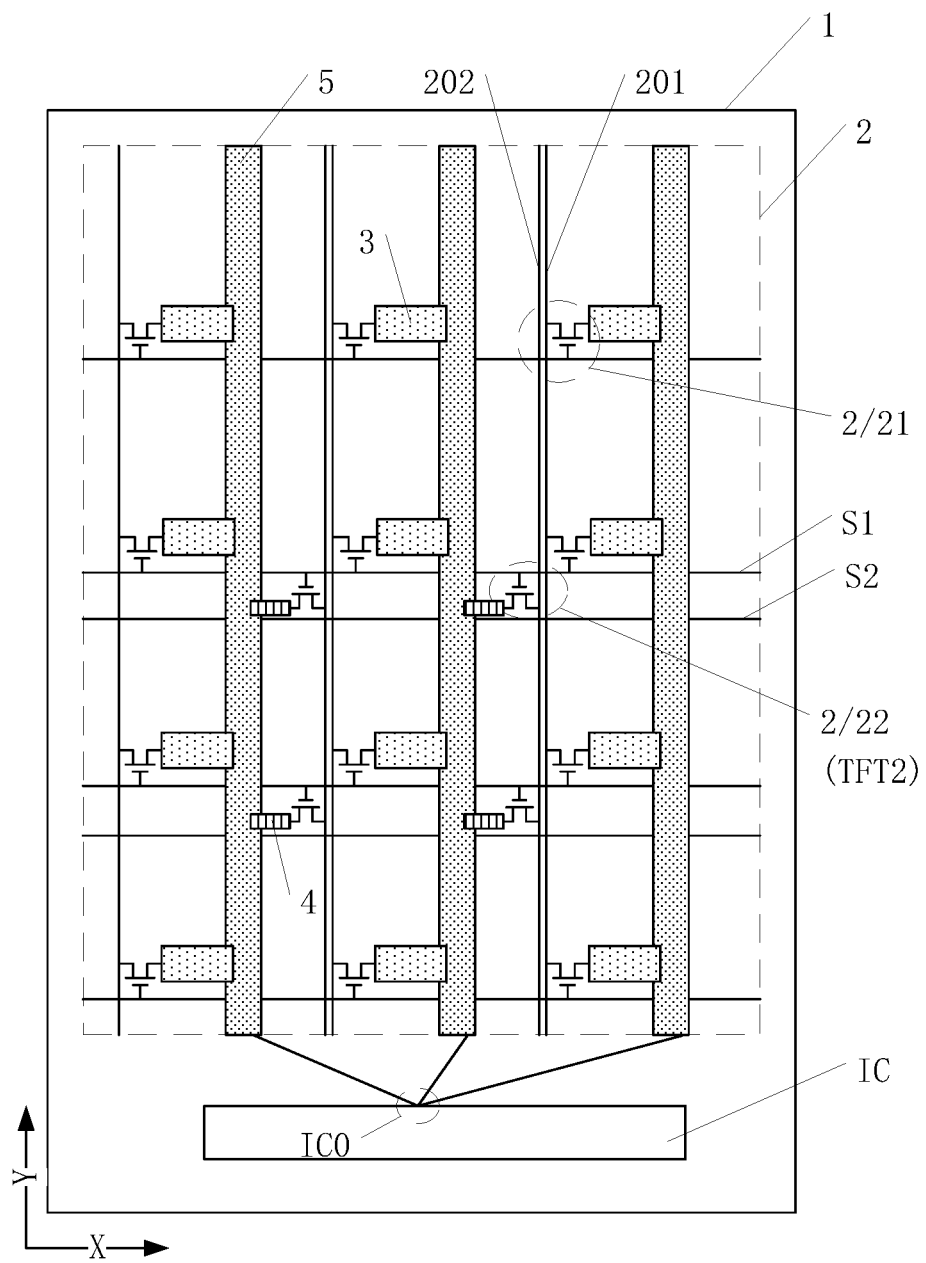
FIG. 18 illustrates a cross-sectional structural schematic of another exemplary display device according to embodiments of the present disclosure.

Optionally, referring to FIG. 18, FIG. 18 illustrates a cross-sectional structural schematic of another exemplary display device according to embodiments of the present disclosure. As shown in FIG. 18, the display device may include a drive chip integrated circuit (IC) which may include a common signal terminal IC0, where the common signal terminal IC0 may be electrically connected to the common signal electrode 5.

Optionally, the signals of the first signal line 201 and the second signal line 202 may also be provided by the IC (not shown). In the display device provided by one embodiment, the signals may be transmitted by the drive chip, and the signal transmission may have fast speed and high accuracy.

From the above-mentioned embodiments, it can be seen that the backlight module and the display device provided by the present disclosure achieve at least the following beneficial effects.

In the backlight module provided by the embodiments, the light-emitting element may use the first drive circuit and the fingerprint recognition element may use the second drive circuit, which may separately drive the light-emitting element and the fingerprint recognition element, so the drive circuits may be conveniently driven or adjusted according to needs during the operation. In addition, the backlight module may be a direct-lit mode, which may not only enable the light emitted from the backlight module to have higher luminance and higher luminous efficiency, but also enable the light emitted from the backlight module to have more uniform light and reduced backlight dark region. Moreover, since the light emitted from the backlight module has higher luminance, when the light emitted from the backlight module reaches the finger and is reflected by the finger back to the fingerprint recognition element, the luminous intensity received by the fingerprint recognition element may also be higher, which may increase the precision of the fingerprint recognition. In addition, the fingerprint recognition element may be arranged between two adjacent light-emitting elements, and there is no need to separately set the space for the fingerprint recognition elements, thereby improving the space utilization rate.

Of course, any of the products embodying the present disclosure does not necessarily need meet all of the technical effects described above at the same time.

The details of the present disclosure have been described through the embodiments provided above. However, those skilled in the art should understand that the disclosed embodiments are exemplary only and are not intended to limit the scope of the present disclosure. Those skilled in the art should understand that the disclosed embodiments can be modified according to the scope and principles of the present disclosure. The scope of the present disclosure is defined by the appended claims and their equivalents.

What is claimed is:

1. A backlight module, comprising:
a first substrate and a drive circuit on a side of the first substrate, wherein the drive circuit includes a first drive circuit and a second drive circuit;
a plurality of light-emitting elements, wherein the plurality of the light-emitting elements is on a side of the drive circuit away from the first substrate; the light-emitting element is electrically connected to the first drive circuit; and the plurality of the light-emitting elements is arranged in an array structure; and
a plurality of fingerprint recognition elements, wherein the plurality of the fingerprint recognition elements and the plurality of the light-emitting elements are on a same side of the first substrate; and the fingerprint recognition element is electrically connected to the second drive circuit, wherein:
the backlight module further includes a common signal electrode on a side of the drive circuit adjacent to the light-emitting element;
the drive circuit includes a plurality of first signal lines, wherein each first signal line extends along a column direction; the plurality of the first signal lines is arranged along a row direction; and the row direction intersects the column direction;
the first drive circuit includes a first input terminal and a first output terminal, wherein the first input terminal is electrically connected to the first signal line; the first output terminal is electrically connected to a first electrode of the light-emitting element; and a second electrode of the light-emitting element is electrically connected to the common signal electrode;
the drive circuit includes a plurality of second signal lines, wherein each second signal line extends along the column direction and the plurality of the second signal lines is arranged along the row direction; and the second drive circuit includes a second input terminal and a second output terminal, wherein the second input terminal is electrically connected to the second signal line; the second output terminal is electrically connected to a first electrode of the fingerprint recognition element; and a second electrode of the fingerprint recognition element is electrically connected to the common signal electrode.

2. The backlight module according to claim 1, wherein:
the fingerprint recognition element is disposed in a same layer of the light-emitting element.

3. The backlight module according to claim 1, wherein:
the second drive circuit include at least one second thin-film transistor which includes a gate, a source, a drain, and an active layer; the fingerprint recognition element is a photosensitive diode which includes a first semiconductor portion, a second semiconductor portion, and an electrode portion; the first semiconductor portion is disposed in a same layer of the active layer and the second semiconductor portion is on a side of the first semiconductor portion adjacent to the common signal electrode; and the electrode portion is on a side of the second semiconductor portion adjacent to the common signal electrode.

4. The backlight module according to claim 3, wherein:
the electrode portion is electrically connected to the common signal electrode through a first via, and the drain of the second thin-film transistor is electrically connected to the first semiconductor portion of the photosensitive diode.

5. A backlight module, comprising:
a first substrate and a drive circuit on a side of the first substrate, wherein the drive circuit includes a first drive circuit and a second drive circuit;
a plurality of light-emitting elements, wherein the plurality of the light-emitting elements is on a side of the drive circuit away from the first substrate; the light-emitting element is electrically connected to the first drive circuit and the plurality of the light-emitting elements is arranged in an array structure; and
a plurality of fingerprint recognition elements, wherein the plurality of the fingerprint recognition elements and the plurality of the light-emitting elements are on a same side of the first substrate; and the fingerprint recognition element is electrically connected to the second drive circuit, wherein:
the backlight module further includes a common signal electrode on a side of the drive circuit adjacent to the light-emitting element;
the drive circuit includes a plurality of first signal lines, wherein each first signal line extends along a column direction; the plurality of the first signal lines is arranged along a row direction; and the row direction intersects the column direction;
the first drive circuit includes a first input terminal and a first output terminal, wherein the first input terminal is electrically connected to the first signal line; the first output terminal is electrically connected to a first electrode of the light-emitting element and a second electrode of the light-emitting element is electrically connected to the common signal electrode; and
the backlight module includes a plurality of backlight sub-regions and at least one fingerprint sensing region; the plurality of light-emitting elements is disposed in each backlight sub-region; the plurality of fingerprint recognition elements is disposed in each fingerprint sensing region; and the fingerprint sensing region overlaps with at least one backlight sub-region.

6. The backlight module according to claim 1, wherein:
the backlight module includes a backlight region and a fingerprint sensing region; the plurality of light-emitting elements is disposed in the backlight region and the plurality of fingerprint recognition elements is disposed in the fingerprint sensing region; and the fingerprint sensing region overlaps with the backlight region.

7. The backlight module according to claim 1, wherein:
the backlight module further includes a plurality of infrared emitters disposed in a same layer of the plurality of light-emitting elements; and
the drive circuit includes a plurality of control lines, wherein each control line extends in the row direction and the plurality of the control lines is arranged along the column direction; a first electrode of the infrared emitter is electrically connected to the control line, and a second electrode of the infrared emitter is electrically connected to the common signal electrode.

8. The backlight module according to claim 7, wherein:
the backlight module includes a plurality of backlight sub-regions, at least one fingerprint sensing region and at least one infrared emitting region; the plurality of light-emitting elements is disposed in each backlight sub-region and the plurality of fingerprint recognition elements is disposed in each fingerprint sensing region; the fingerprint sensing region overlaps with at least one backlight sub-region; the plurality of the infrared emitters is disposed in each infrared emitting region; and the infrared emitting region at least partially overlaps with the fingerprint sensing region.

9. The backlight module according to claim 8, wherein:
the plurality of the fingerprint recognition elements in the fingerprint sensing region is arranged in an array structure, and the plurality of the infrared emitters is disposed surrounding the fingerprint sensing region.

10. The backlight module according to claim 7, wherein:
the backlight module includes a backlight region, a fingerprint sensing region and an infrared emitting region; the plurality of the light-emitting elements is disposed in the backlight region; the plurality of the fingerprint recognition elements is disposed in the fingerprint sensing region; the plurality of the infrared emitters is disposed in the infrared emitting region; and the backlight region overlaps with each of the fingerprint sensing region and the infrared emitting region.

11. The backlight module according to claim 10, wherein:
for adjacent two rows of the light-emitting elements, one row of the light-emitting elements and the fingerprint recognition elements are alternatively arranged in the row direction, and another row of the light-emitting elements and the infrared emitters are alternatively arranged in the row direction; and the fingerprint recognition elements and the infrared emitters are located in two adjacent columns of the light-emitting elements, and the fingerprint recognition elements and the infrared emitters are alternatively arranged along the column direction.

12. A display device, comprising:
a backlight module, including:
- a first substrate and a drive circuit on a side of the first substrate, wherein the drive circuit includes a first drive circuit and a second drive circuit;
- a plurality of light-emitting elements, wherein the plurality of the light-emitting elements is on a side of the drive circuit away from the first substrate; the light-emitting element is electrically connected to the first drive circuit; and the plurality of the light-emitting elements is arranged in an array structure; and
- a plurality of fingerprint recognition elements, wherein the plurality of the fingerprint recognition elements and the plurality of the light-emitting elements are on a same side of the first substrate; and the fingerprint recognition element is electrically connected to the second drive circuit; and a display panel, the display panel being a liquid crystal display panel and disposed opposite to the backlight module, wherein the display device further includes a diffuser plate, a brightness enhancement film and an infrared anti-reflection film; the diffuser plate is on a side of the light-emitting element away from the first substrate; the brightness enhancement film is on a side of the diffuser plate away from the first substrate; and the infrared anti-reflection film is on a side of the brightness enhancement film away from the first substrate.

13. The display device according to claim 12, wherein:
the display panel includes a second substrate and a plurality of pixel units on the second substrate; the plurality of the pixel units is on a side of the second substrate adjacent to the light-emitting elements; and each pixel unit includes a plurality of sub-pixels; and
an orthographic projection of the fingerprint recognition element on the first substrate at least partially overlaps with an orthographic projection of one pixel unit on the first substrate.

14. The display device according to claim 13, wherein:
the pixel unit at least includes one white sub-pixel.

15. The display device according to claim 12, wherein:
an orthographic projection of the infrared anti-reflection film on the brightness enhancement film at least partially covers the brightness enhancement film.

16. The display device according to claim 12, wherein:
the display device includes a drive chip; and
the drive chip includes a common signal terminal electrically connected to the common signal electrode.

17. The display device according to claim 12, wherein:
the backlight module further includes a common signal electrode on a side of the drive circuit adjacent to the light-emitting element and a plurality of infrared emitters disposed in a same layer of the plurality of light-emitting elements;
the drive circuit includes a plurality of first signal lines and a plurality of control lines, wherein
each first signal line extends along a column direction; the plurality of the first signal lines is arranged along a row direction; and the row direction intersects the column direction;
the first drive circuit includes a first input terminal and a first output terminal, wherein the first input terminal is electrically connected to the first signal line; the first output terminal is electrically connected to a first electrode of the light-emitting element; and a second electrode of the light-emitting element is electrically connected to the common signal electrode;
each control line extends in the row direction and the plurality of the control lines is arranged along the column direction; a first electrode of the infrared emitter is electrically connected to the control line, and a second electrode of the infrared emitter is electrically connected to the common signal electrode.

* * * * *